United States Patent
Rink et al.

(10) Patent No.: US 6,755,438 B2
(45) Date of Patent: Jun. 29, 2004

(54) ELONGATED INFLATOR DEVICE AND METHOD OF GAS PRODUCTION

(75) Inventors: Karl K. Rink, Princeton, ID (US); David J. Green, Brigham City, UT (US); Anthony M. Young, Malad, ID (US)

(73) Assignee: Autoliv ASP, Inc., Ogden, UT (US)

( * ) Notice: Subject to any disclaimer, the term of this patent is extended or adjusted under 35 U.S.C. 154(b) by 147 days.

(21) Appl. No.: 10/085,644

(22) Filed: Oct. 22, 2001

(65) Prior Publication Data

US 2003/0075908 A1 Apr. 24, 2003

(51) Int. Cl.[7] .............................................. B60R 21/026
(52) U.S. Cl. ...................... 280/736; 280/741; 280/742
(58) Field of Search ................................ 280/736, 741, 280/742; 149/109.6

(56) References Cited

U.S. PATENT DOCUMENTS

| | | |
|---|---|---|
| 3,674,578 A | 7/1972 | Cattermole et al. |
| 3,765,964 A | 10/1973 | Wade |
| 4,104,092 A | 8/1978 | Mullay |
| 4,141,767 A | 2/1979 | Sudweeks et al. |
| 4,231,821 A | 11/1980 | Sudweeks et al. |
| 5,028,070 A | 7/1991 | Bender |
| 5,351,618 A | 10/1994 | Brent et al. |
| 5,660,803 A | 8/1997 | Brede et al. |
| 5,684,269 A | 11/1997 | Barnes et al. |
| 5,747,730 A | 5/1998 | Scheffee et al. |
| 5,788,270 A | 8/1998 | HÅland et al. |
| 5,850,053 A | 12/1998 | Scheffee et al. |
| 5,851,030 A | * 12/1998 | Johnson et al. ............. 280/741 |
| 5,854,442 A | 12/1998 | Scheffee et al. |
| 5,997,666 A | 12/1999 | Wheatley |
| 6,170,867 B1 | 1/2001 | Rink et al. |
| 6,176,950 B1 | 1/2001 | Wood et al. |

OTHER PUBLICATIONS

Wang Xuguang: *Emulsion Explosives*, Metallurgical Industry Press, Beijing, 4–9, 59–63, 99–119, 1994.

M. Held: *Experiments of Initiation of Covered, but Unconfined High Explosive Charges by means of Shaped Charge Jets*, Propellants, Explosives, Pyrotechnics 12, 35–40 (1987).

M. Held: *Experiments of Initiation of Covered, but Unconfined HE Charges under Different Test Conditions by Shaped Charge Jets*, Propellants, Explosives, Pyrotechnics 12, 97–100 (1987).

M. Held: *Discussion of the Experimental Findings from the Initiation of Covered, but Unconfined High Explosive Charges with Shaped Charge Jets*, Propellants, Explosives, Pyrotechnics 12, 167–174 (1987).

* cited by examiner

Primary Examiner—Eric Culbreth
(74) Attorney, Agent, or Firm—Sally J. Brown

(57) ABSTRACT

Inflation apparatuses are provided employing an elongated enclosed housing which contains a non-gaseous, fluid form of gas generant material. The housing can desirably be sufficiently flexible to permit the inflator device to be desirably shaped such as to facilitate the specific placement and location thereof within the interior of a vehicle. Also, provided are associated methods of gas production.

33 Claims, 2 Drawing Sheets

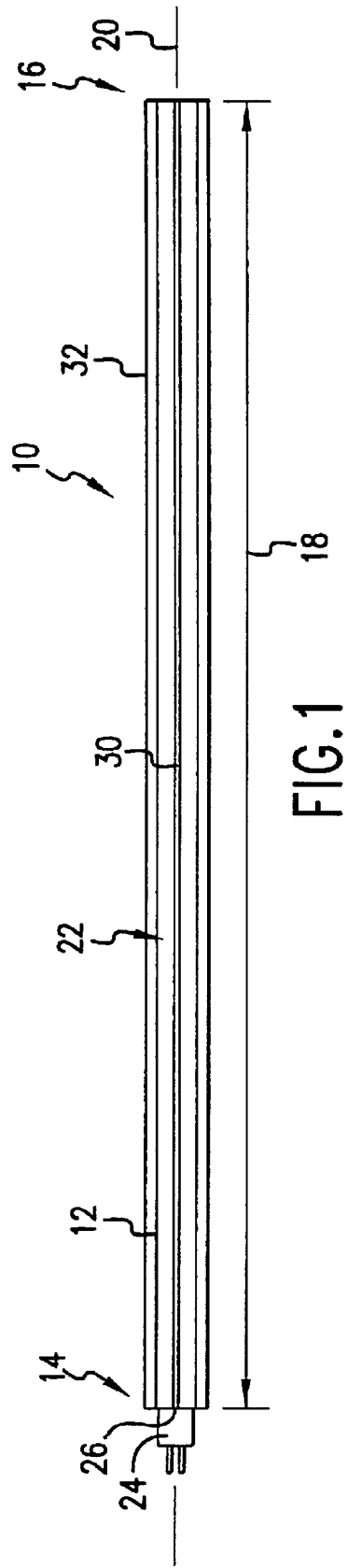
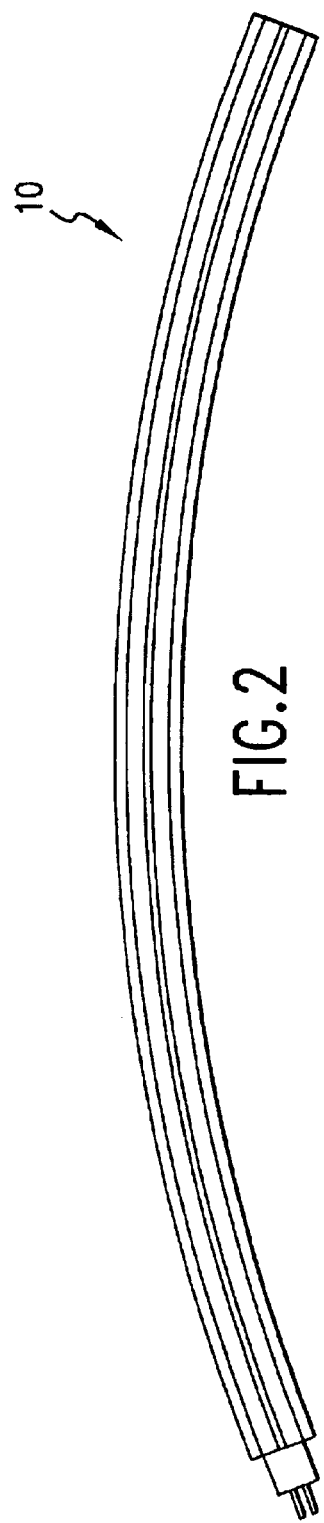

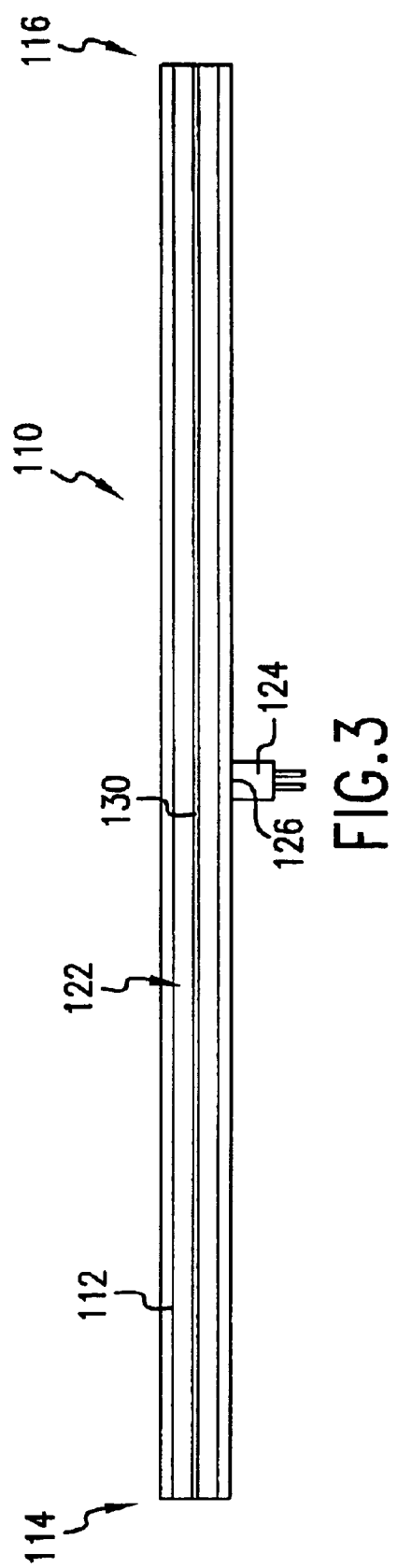

ELONGATED INFLATOR DEVICE AND METHOD OF GAS PRODUCTION

BACKGROUND OF THE INVENTION

This invention relates generally to the providing or supplying of inflation gas and, more particularly, to the providing or supplying of such inflation gas via an elongated inflator such as may be desired for certain inflatable passive restraint systems for use in vehicles for restraining the movement of an occupant in the event of a vehicular collision.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint element, such as in the form of a cushion or bag, commonly referred to as an "airbag cushion," and a gas generator device, commonly referred to as an "inflator."

In practice, upon actuation such as when the vehicle encounters a sudden deceleration, such as in the event of a collision, the inflator device serves to provide an inflation fluid, typically in the form of a gas, used to inflate an associated airbag cushion. Airbag cushions are typically used to deploy into one or more locations within the vehicle between the occupant and certain parts of the vehicle interior, such as the doors, steering wheel, instrument panel or the like, to prevent or avoid the occupant from forcibly striking such parts of the vehicle interior.

Various types or forms of such passive restraint assemblies have been developed or tailored to provide desired vehicle occupant protection such as based on either or both the position or placement of the occupant within the vehicle and the direction or nature of the vehicle collision, for example. In particular, driver side and passenger side inflatable restraint installations have found wide usage for providing protection to drivers and front seat passengers, respectively, in the event of head-on types of vehicular collisions. Driver side and passenger side inflatable restraint installations do not, however, generally provide as great as may be desired protection against vehicular impacts inflicted or imposed from directions other than head-on, i.e., "side impacts." In view thereof, substantial efforts have been directed to developing inflatable restraint installations having particular effectiveness in the event of a side impact.

Upon deployment, the time period during which an airbag cushion remains pressurized is commonly referred to as "stand-up time." In practice, driver side and passenger side airbag cushions are typically desirably designed to begin deflating almost instantaneously upon deployment such as to avoid presenting an undesirably hard or ungiving surface to an oppositely situated vehicle occupant. However, airbag cushions which provide substantially longer stand-up times may be required or desired in the event of certain accidents or collisions in order to provide a level of occupant protection suitable in the event of such an occurrence. For example, one particularly troublesome form of side impact is commonly referred to as a "roll-over." In a roll-over incident, a vehicle may undergo a partial, complete or multiple roll-over. As will be appreciated by those skilled in the art, roll-over accidents can be particularly demanding on inflatable restraint systems. In particular, an airbag cushion designed to provide occupant protection in the event of a vehicle roll-over may be required or desired to remain pressurized for an extended or prolonged period of time, as compared to usual or typical driver side and passenger side airbag installations. For example, a roll-over protection side impact airbag cushion may called on to desirably remain pressurized or provide a stand-up time such as extending for as long as about 5 seconds or more.

One particularly effective form of side impact inflatable restraint is the subject of HÅland et al., U.S. Pat. No. 5,788,270, issued Aug. 4, 1998, the disclosure of which patent is hereby incorporated by reference herein in its entirety and made a part hereof. Inflatable elements, such as disclosed in HÅland et al., U.S. Pat. No. 5,788,270, may desirably include an inflatable portion formed from two layers of fabric with the front layer and the back layer of the fabric woven together at selected points. In particular embodiments, such selected points are arranged in vertically extending columns and serve to divide the inflatable part into a plurality of vertical parallel chambers. The spaces between the selected points permit internal venting between adjacent chambers of the inflatable element. Particular such inflatable devices/elements, such as utilized in applications to provide protection over an extended area and having a generally planar form, are frequently referred to as "inflatable curtains."

A one piece woven construction has been found to be a particularly effective method of forming such inflatable element airbag cushions. In particular, one piece woven constructions have been found to provide a relatively low cost method of constructing suitable such airbag cushions which provide desired stand-up times. While inflatable element airbag cushions can, as is known in the art, be fabricated of various materials, nylon 6,6 has been found to be a particularly effective and useful material for use in the making or manufacture of inflatable curtain elements such as described above and having a one piece woven design.

Many types or forms of inflator devices have been disclosed in the art for use in inflating inflatable restraint system airbag cushions. In at least certain particular inflatable passive restraint system installations, an inflator device having a flexible form or construction is desired. For example, in at least certain installations which involve inflatable curtain restraints, the use of an inflator device having a flexible form or construction can desirably serve to permit such an inflator device to more easily conform or fit within a selected storage volume in the vehicle, such as within the vehicle headliner along the roofline. As a result, incorporation and use of flexible inflator devices can provide or result in improved fit or installation within a vehicle.

One particularly common type or form of inflator device used in inflatable passive restraint systems is commonly referred to as a pyrotechnic inflator. In such inflator devices, gas used in the inflation of an associated inflatable element is typically derived from the combustion of a solid pyrotechnic gas generating material. While various combustible pyrotechnic materials are available, gas generant compositions commonly utilized in the inflation of automotive inflatable restraint airbag cushions have previously most typically employed or been based on sodium azide. The gas generated by the combustion of such pyrotechnic materials can be very hot and may contain variously sized particulate material. In practice, it is relatively common to include within such inflator devices one or more filters or the like elements effective to either or both remove such particulate and reduce the temperature of the gas prior to discharge therefrom. Nevertheless, gas discharge temperatures in the range of about 1300 K are common for conventional pyrotechnic inflator devices. In view thereof, it is common to include within an associated airbag cushion a heat resistant coating or one or more strategically placed patches of heat resistant material such as to minimize or avoid direct contact of the hot inflator discharge onto unprotected airbag cushion material. Further, in particular applications which rely on an inflation gas having a significantly elevated temperature, attaining desired stand-up times for or with the associated airbag cushion can prove difficult as the volume of the inflation gas reduces as the gas cools.

Further, while various flexible inflator devices containing or employing solid gas generant materials have been previously proposed, such solid-containing inflator devices have generally been subject to certain limitations or drawbacks, even in those inflator constructions which employ solid gas generant materials in a powdered form. In particular, solid-containing inflator devices are commonly subject to problems associated or related with: ignition and flame spread, difficulty in attaining and maintaining a desired distribution of the solid along the length of the inflator, as well as fretting or mechanical wear of the solid such as due to or resulting from flexing of the inflator device housing.

Another common form or type of inflator device utilizes or relies on a stored compressed gas. Upon actuation, such devices release the stored gas into an associated airbag cushion to effect the inflation thereof. While such inflator devices may reduce or avoid problems relating to particulate and hot gas discharges, such inflators generally require the potentially long-term storage of a material under pressure. Such long-term pressure storage can raise concerns regarding undesirable leakage over the course of the relatively long design lifetimes of such systems once installed in vehicles. As will be appreciated, providing for such storage under pressure can require application and use of substantial containment features for the material stored under pressure. In practice, such containment features are commonly evidenced by a relatively thick-walled, rigid containment chamber. Further, it is generally difficult to provide desired flexibility in an inflator design which employs such a thick-walled, rigid containment chamber.

Yet another common form or type of inflator device utilizes or relies on a combination of stored compressed gas and combustion of a gas generating material, e.g., a pyrotechnic, to produce or form an inflation gas for an associated airbag cushion. Such an inflator device is commonly referred to as an augmented gas or hybrid inflator. As with the above-identified pyrotechnic inflators, such inflator devices may result in a gas having an undesirably large or high particulate content. Also, while the discharge from such a hybrid inflator device is generally at a reduced temperature as compared to a corresponding pyrotechnic inflator, the temperature of such discharge may still be undesirably high for certain applications. Further, such inflator devices may suffer from at least some of the possible complications and related concerns regarding the potentially long term storage of a material under pressure. In addition, the provision of such inflator devices in a flexible form is generally subject to the same limitations or drawbacks discussed above relative to those inflator devices which contain solid gas generant or compressed gas, respectively.

In view of the above, there is a continuing need and demand for improved inflator devices, for inflating inflatable restraint elements, which overcome one or more of the above-identified problems. In particular, there is a need and a demand for an inflator device having a shapable form or construction such as to facilitate desired installation or placement thereof in particular locations within the interior of a vehicle, such as along the roof line of a vehicle such as above a vehicle door. In particular, there is a need and a demand for such an inflator device particularly suited for use in conjunction with specific types of inflatable restraint elements, such as inflatable curtain forms or types of inflatable elements.

SUMMARY OF THE INVENTION

A general object of the invention is to provide an improved inflator device for inflating an inflatable restraint device as well as an improved method of gas production.

A more specific objective of the invention is to overcome one or more of the problems described above.

The general object of the invention can be attained, at least in part and in accordance with one preferred embodiment of the invention, through an inflator device for inflating an inflatable restraint device and which inflator device includes an enclosed housing having an elongated length and opposed first and second ends. The inflator device also includes a quantity of a gas generant material disposed within the housing. The gas generant material is desirably in a non-gaseous, fluid form and substantially extends between the first and second ends of the housing. The inflator device further includes an initiator device disposed adjacent the housing. The initiator device, upon actuation, has a discharge portion in reaction initiating contact with at least a portion of the quantity of the gas generant material disposed within the housing and wherein upon actuation, the initiator device initiates reaction of the gas generant material to produce inflation gas.

The prior art generally fails to provide an elongated inflator of suitable design and construction such as to desirably permit the inflator device to be shaped to a non-linear elongated axis form and such as may be desired to facilitate installation or placement thereof in particular locations within the interior of a vehicle, such as along the roof line of a vehicle such as above a vehicle door. In particular, the prior art generally fails to provide such an inflator device particularly suited for use in conjunction with specific types of inflatable restraint elements, such as inflatable curtain forms or types of inflatable elements. That is, the prior art generally fails to provide such an inflator device having or being of sufficiently flexibility and small enough diameter to facilitate such placement in a vehicle while simultaneously providing sufficient inflation gas in sufficient quantities and at desired point(s) in time to provide desired side impact protection.

The invention further comprehends an inflator device for inflating an inflatable restraint device and which inflator device includes a tubular housing having an elongated length and opposed first and second ends. The inflator device also includes a quantity of a gas generant material disposed within the tubular housing. The gas generant material desirably has a non-gaseous, fluid form and substantially extends between the first and second ends of the tubular housing. The gas generant material contains a quantity of sensitizing gas selected from the group consisting of oxygen, nitrous oxide, carbon dioxide and mixtures thereof. The inflator device further includes an initiator device disposed adjacent the tubular housing and a sheath covering disposed about the exterior of the tubular housing. Upon actuation, the initiator device has a discharge portion in reaction initiating contact with at least a portion of the quantity of the gas generant material disposed within the tubular housing such that, upon actuation, the initiator device initiates reaction of the gas generant material to produce inflation gas resulting in opening of the tubular housing and release of at least a portion of the inflation gas therefrom. The sheath covering is effective to retain therewithin fragmentary portions of the tubular housing such as may be formed upon the opening thereof.

The invention still further comprehends an improvement in a method wherein a quantity of a liquid phase gas generant material is reacted to produce gas. In accordance with one embodiment of the invention, such improvement involves including a sufficient quantity of gaseous matter in the liquid phase gas generant material to improve reaction characteristics of the gas generant material.

As used herein, references to "combustion," "combustion reactions" and the like are to be understood to generally refer to the exothermic reaction of a fuel with an oxidant.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A/(F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Other objects and advantages will be apparent to those skilled in the art from the following detailed description taken in conjunction with the appended claims and drawings.

BRIEF DESCRIPTION OF THE DRAWINGS

FIG. 1 is a simplified, partially in section, schematic drawing of an airbag inflator in accordance with one embodiment of the invention.

FIG. 2 is a simplified, partially in section, schematic drawing of the airbag inflator shown in FIG. 1 shaped in a non-linear form.

FIG. 3 is a simplified, partially in section, schematic drawing of an airbag inflator in accordance with another embodiment of the invention.

DETAILED DESCRIPTION OF THE INVENTION

The present invention, as detailed below, provides an improved inflator device for inflating an inflatable restraint device as well as an improved method of gas production. The invention may be embodied in a variety of different structures. Referring initially to FIGS. 1 and 2, there is illustrated an apparatus for inflating an inflatable device, also sometimes referred to hereinafter as an "inflator" or "inflator device," generally designated by the reference numeral 10, in accordance with one preferred embodiment of the invention and such as may be used to inflate an inflatable vehicle occupant restraint element, e.g., an inflatable airbag cushion, (not shown). FIG. 1 shows the inflator 10 having a linear form. FIG. 2 depicts the inflator 10 shaped in a non-linear form.

As is known, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

The invention is described hereinafter with particular reference to an inflator for use in various automotive vehicles including vans, pick-up trucks, and particularly automobiles. Further, as more specifically described herein below, inflators in accordance with the invention are believed particularly well suited for application or use with or in side impact airbag assemblies and, in particular, such side impact airbag assemblies as employ inflatable curtain forms or types of inflatable elements. Based on the teachings herein provided, however, it is to be appreciated that the invention has applicability not only to other various types or kinds of inflation applications such as airbag installations for automotive vehicles including driver side and passenger side airbag assemblies, for example, but also the invention has applicability with other types of vehicles as well, including airplanes, for example.

The inflator 10 comprises a housing 12 having opposed closed first and second ends, 14 and 16, respectively. The inflator device 10 and, more particularly, the housing 12 thereof, is generally elongated, having a length designated by the reference numeral 18 as measured along the axis 20 shown in FIG. 1 and such that it desirably has a length to diameter ratio (L/D ratio) of at least about 4 and, preferably in accordance with certain preferred embodiments of the invention, an L/D ratio in the range of at least about 5 to no more than about 75 (i.e., $5 \leq L/D \leq 75$) and, more preferably, in the range of at least about 10 to no more than about 50 (i.e., $10 \leq L/D \leq 50$), such as may be desired for the more effective inflation of various elongated inflatable elements such as at least certain inflatable curtain inflatable elements. Those skilled in the art will appreciate that inflator devices of relatively small diameter (e.g., inflators with diameters of less than 30 mm, preferably inflators with diameters of less than 25 mm and, even more preferably, inflators with diameters of less than 20 mm) and suitably large L/D ratios desirably permit and facilitate assemblies wherein such inflator assembly is contained in whole or in part within an associated inflatable device, such as an inflatable element in the form of an inflatable curtain airbag cushion. Also, the inflator 10 may desirably be small enough, e.g., have a diameter small enough, that the installation or placement thereof in particular locations within the interior of a vehicle, such as along the roof line of a vehicle such as above a vehicle door, is facilitated.

In the illustrated static state, the housing 12 stores or contains a quantity or supply of a gas generant material 22. In accordance with a preferred practice of the invention, the gas generant material 22 disposed within the housing 12 desirably has a non-gaseous, fluid form. In particular preferred embodiments of the invention, such a non-gaseous, fluid form may take the form or comprise a liquid, a paste, a gel or the like or mixtures thereof. Further, as detailed below and in accordance with certain preferred embodiments of the invention, the non-gaseous, fluid form of gas generant material used in the practice of the invention though itself is non-gaseous may contains a quantity of sensitizing gas.

Those skilled in the art and guided by the teachings herein provided will appreciate that various specific gas generant materials can be used in the practice of the invention. Suitable gas generant materials for use in the invention include, but are not necessarily limited to, gas generant materials selected from the classes of slurry formulations and emulsion formulations.

In particular, suitable slurry formulation gas generant materials for use in the practice of the invention generally constitute a thickened, supersaturated solution of oxidizer in water with fuel, burn rate modifier and ignition enhancement material. Examples of oxidizer materials for use or incorporation in such slurry forms of gas generant materials include ammonium nitrate, ammonium perchlorate, as well as alkali and alkaline earth metal nitrates and perchlorates. Examples of fuel materials for use or incorporation in such slurry forms of gas generant materials can be water soluble, such as glycols or alcohols, guanidine derivatives or salts, urea derivatives or salts, tetrazole derivatives or salts, etc. or particulate in nature such as metal powders or insoluble organic compounds. As will be appreciated, such generally water-insoluble fuels can act as burn rate accelerators or suppressors. The fuel component of such gas generant material slurry formulation, in accordance with certain preferred embodiments of the invention, constitutes a combination of one or more of such water-soluble fuels and one or more of such water-insoluble fuels. In addition, suitable slurry formulations may additionally contain or include other desired additives such as thickening agents such as guar gum, gelatine or the like.

Suitable emulsion formulation gas generant materials for use in the practice of the invention can take the form of a water-oil emulsion such as containing a discontinuous phase, supersaturated water solution of an oxidizer such as selected from the group consisting of ammonium nitrate, ammonium perchlorate, alkali and alkaline earth metal nitrates and perchlorates. Alternatively, a molten oxidizer salt discontinuous phase may be employed. The continuous or fuel phase of the emulsion contains water insoluble fuels such as oils (either or both synthetic and natural), waxes, or combinations thereof. A surfactant can desirably be used to assist in the creation of the emulsion. Suitable surfactants for use in the invention include cationic, anionic, nonionic and amphoteric surfactants, as are known in the art. In addition to the continuous fuel phase, particulate fuels or additives may also be used or included in the formulation such as to desirably modify ballistic or other properties or characteristics of the formulation. Examples of such materials include, but are not necessarily limited to, cellulose materials such as sawdust, woodchips, nut shells and the like and glass or plastic bits or pieces such as in the form of microspheres or the like.

In certain preferred embodiments of the invention, it has been found desirable for the gas generant material to contain a quantity of sensitizing gas and such as may desirably serve to improve reaction characteristics of the gas generant material. In particular, the inclusion or presence of such sensitizing gas can desirably sensitize gas generant materials, such as described above. It is theorized that the presence or inclusion of such a sensitizing gas acts or serves to form or create local regions within the inflator housing whereat the sensitizing gas can be compressed and such as to create or form local "hot spots" and such as may in turn serve as or otherwise form or create ignition sites, i.e., sites whereat ignition of the gas generant material favorably occurs such as to produce or form gaseous reaction products. As will be appreciated, the creation or inclusion of a plurality of such ignition sites in a reaction medium can desirably facilitate or speed the reaction and gas generation process such as may be desired in various inflatable device applications.

Those skilled in the art and guided by the teachings herein provided will appreciate that a variety of gaseous materials can desirably be used in the practice of the invention. For example, gaseous materials for use as a sensitizing gas in the practice of the invention may desirably be an inert gas such as helium, argon or mixtures thereof. In accordance with certain preferred embodiments of the invention, the sensitizing gas materials may desirably constitute oxidant or oxidant source gas materials such as may be desirably selected from the group consisting of oxygen, nitrous oxide, carbon dioxide and mixtures thereof and such as may contribute to more complete combustion, i.e., increased combustion efficiency. The use of nitrous oxide as a sensitizing gas material in accordance with the invention is believed particularly advantageous as such nitrous oxide can desirably undergo exothermic dissociation such as to release additional heat and increase molar content of gaseous products. Further, if subjected to a sufficiently high pressure, such included nitrous oxide can be liquified such as to further increase the density of the contents of the inflator and such as may serve to further reduce the space or volume requirements thereof. In contrast, carbon dioxide generally involves an endothermic dissociation and may undesirably contribute to or otherwise increase the production or formation of carbon monoxide.

Further, in accordance with certain embodiments of the invention, the sensitizing gaseous materials may desirably constitute a combustible gaseous mixture such as may be prone to ignition upon sufficient compression and/or heating. In practice, such a combustible mixture may desirably contain an oxidant or oxidant source material component and a fuel material component. As will be appreciated, the exothermic reaction of such a sensitizing combustible gaseous mixture can desirably serve to aid the ignition process within a corresponding inflator device. Further, such combustible gaseous mixture can be simply added to the gas generant material asa premixed gas mixture.

Suitable oxidant or oxidant source materials may, for example, include oxygen, air, nitrous oxide, or carbon dioxide, either alone or in a combination of two or more thereof. Suitable fuel materials may include one or more paraffin, olefin, ether, napthalene or hydrogen gas, either alone or in a combination of two or more thereof. Examples of particular combustible mixture sensitizing gaseous materials include mixtures of methane with either air and/or nitrous oxide. For ease of manufacture, a cyrogenically or otherwise frozen mass of a fuel material such as butane, ethylene or a mixture thereof with an oxidant source material such as nitrous oxide may be preferred for use.

It will be appreciated by those skilled in the art and guided by the teachings herein provided that certain safety concerns may restrict or otherwise limit the use of a sensitizing combustible gaseous mixture. More particularly, such sensitizing combustible gaseous mixtures used in the practice of the invention will generally have an equivalence ratio of at least about 0.2 and no more than about 1.2 (i.e., $0.2 \leq \phi \leq 1.2$), preferably, such sensitizing combustible gaseous mixtures used in the practice of the invention will have an equivalence ratio of at least about 0.4 and no more than about 1.0 (i.e., $0.4 \leq \phi \leq 1.0$) and, more preferably, such sensitizing combustible gaseous mixtures used in the practice of the invention will have an equivalence ratio of at least about 0.6 and no more than about 0.8 (i.e., $0.6 \leq \phi \leq 0.8$).

With regard to the amount of sensitizing gas, it will generally be appreciated that such amount is generally dependent on the conditions, such as temperature and pressure, to which the materials are subjected. Generally, the amount of gas that can be held, entrapped or otherwise included or contained in a liquid will increase with an increase in temperature and/or a decrease in pressure. Further, where the ratio of the mass of sensitizing gas to the total mass of the non-gaseous, fluid form of gas generant material is represented by $X_{EG}$, in accordance with certain preferred embodiments of the invention, such ratio is generally no more than about 0.10 (i.e., $0 \leq X_{EG} \leq 0.10$), preferably, such ratio is at least about 0.001 and no more than about 0.05 (i.e., $0.001 \leq X_{EG} \leq 0.05$) and, more preferably, such ratio is at least about 0.005 and no more than about 0.01 (i.e., $0.005 \leq X_{EG} \leq 0.01$).

Gas generant materials such as described above and desired for use in the practice of the invention may generally contain 0–50% water, 25–95% inorganic oxidizer salt, 0–25% organic fuel, 0–10% metal fuel and 0–5% surfactant. Preferred such gas generant materials preferably include or contain 5–30% water, 35–85% inorganic oxidizer salt, 1–25% organic fuel, 0.1–5% metal fuel and 0.05–2.5% surfactant. Most preferably, such gas generant materials include or contain 10–25% water, 45–80% inorganic oxidizer salt, 2–20% organic fuel, 0.2–2% metal fuel and 0.1–1.0% surfactant, where such percentages are in terms of weight percent.

In practice, the housing 12 is desirably sized such that the supply of gas generant material 22 stored or contained therewith substantially extends between the first and second housing ends, 14 and 16, respectively, such as to most efficiently utilize the volume occupied thereby.

The inflator 10 includes an initiator device 24, such as is known in the art, disposed adjacent the housing 12. In particular, in the inflator 10, the initiator device 24 is disposed at the end 14 of the housing 12 such as to at least partially close such housing end. The initiator device 24 has a discharge end or portion, generally designated by the reference numeral 26, in reaction initiating contact with at least a portion of the quantity of the gas generant material 22 disposed within the housing 12 such that, upon actuation of the initiator device 24, reaction of the gas generant material 22 can be properly and accordingly initiated.

In certain embodiments and as shown with the inflator 10, inflator devices in accordance with the invention may desirably contain or include an ignition device, designated by the reference numeral 30. The ignition device 30 can desirably be in or of the form of a flexible linear ignition cord such as rapid deflagration cord (also known as RDC and generally constituting a mixture of cesium hydroborate and potassium nitrate), ITLX detonated cord or the like, as are generally known in the art and such as can desirably extend substantially between the first and second housing ends, 14 and 16, respectively, and desirably centered along the axis 20. Actuation of the initiator device 24 desirably results in initiation of the ignition device 30. As will be appreciated, the inclusion and use of such or similar ignition device 30 can desirably serve to assist in attaining rapid and desirably uniform reaction of the gas generant material 22 extending over the longitudinal length of the housing 12.

As will be appreciated by those skilled in the art and guided by the teachings herein provided, such a housing can be variously constructed or formed without departing from the invention. For example, such a housing can be tubular in form and have a circular cross section or, if desired, a non-circular cross section such as a rectangular, triangular or other specifically desired cross section, as may be desired for or in particular installations or applications. Further, such a housing can be fabricated or formed of various suitable materials including but not necessarily limited to, various polymeric materials including vinyl, polyurethane, PTFE, nylon, PVC, polypropylene, polyethylene, as well as various rubber materials, for example, and such as dependent on the requirements of the particular application.

Reaction of the gas generant material 22 contained therewith desirably results in the production of inflation gas such as can be discharged and communicated from the inflator 10 to an associated inflatable restraint element, e.g., an airbag cushion. As will be appreciated, the inflator can be variously constructed or formed to permit the desired release and communication of such inflation gas to an inflatable restraint element. For example, an inflator in accordance with one embodiment of the invention may simply involve the rupture or opening of the housing 12 when the pressure therewith has increased, through inflation gas production, beyond a specified or designed-for threshold. It will be appreciated that the housing, may if desired, include design features such as notches, grooves or the like such as to concentrate stresses and more specifically locate the area or section of the housing whereat such rupture or opening will desirably occur.

Further, inflators in accordance with the invention may also include a sheath 32 or the like outer covering, such as disposed about the exterior of the housing 12, and such as may desirably serve to avoid or prevent discharge or release of housing fragments such as may be formed upon the rupture or opening of the housing 12. It will be appreciated that the use of sheaths of various constructions and forms are contemplated and are herein encompassed. For example, suitable sheaths for use in the practice of the invention may include sheaths formed of various braided materials such as braided steel, glass fiber or polymeric fiber such as the aromatic polyamide fiber known as KEVLAR as well as woven materials such as metal, e.g., steel, screen or cloth of various materials.

As identified above, FIG. 2 depicts the inflator 10 shaped in a non-linear form. In particular, flexible inflators in accordance with the invention are believed to have particular advantageous application in conjunction with inflatable curtain restraint elements, as described above. For example, those skilled in the art and guided by the teachings herein provided will appreciate that a flexible inflator such as capable of being shaped to an appropriate non-linear elongated axis form can be well suited for installation in various irregularly shaped volumes within the interior of a vehicle.

Thus, the invention is believed to have particular utility in installation locations such as within the vehicle headliner along the roofline, such as commonly used or desired for use with inflatable curtain restraint elements.

While the invention has been described above making reference to FIGS. 1 and 2 which illustrate an inflator device 10 having an initiator device 24 disposed adjacent the housing 12 at one end 14 thereof, those skilled in the art and guided by the teachings herein provided will appreciate that the broader practice of the invention is not necessarily so limited. For example, FIG. 3 illustrates an inflator 110 in accordance with another embodiment of the invention. The inflator 110 is generally similar to the inflator 10 described above in that it similarly includes an elongated housing 112 having opposed closed first and second ends, 114 and 116, respectively. The housing 112 stores or contains a quantity or supply of a gas generant material 122 such as described above and such as may contain sensitizing gas, as also described above.

The inflator 110 includes an initiator device 124, such as is known in the art, disposed adjacent the housing 112, but here situated at a location, intermediate the ends 114 and 116. The initiator device 124 has a discharge end or portion, generally designated by the reference numeral 126, in reaction initiating contact with at least a portion of the quantity of the gas generant material 122 disposed within the housing 12 such that, upon actuation of the initiator device 124, reaction of the gas generant material 122 can be properly and accordingly initiated.

As with the inflator 10, the inflator 110 is also shown as containing or including an ignition device such as described above and here designated by the reference numeral 130. Those skilled in the art and guided by the teachings herein provided will appreciate, that in such an embodiment wherein the initiator device 124 is centrally positioned or located, the motivation or need to include such an ignition device such as to effect a more rapid or uniform initiation of reaction of or by the gas generant material 122, can be reduced and, in accordance with a preferred embodiment, eliminated. As will further be appreciated, one or more of the manufacture, production and operation of an inflator device in accordance with the invention can be facilitated or simplified and the costs associated therewith correspondingly reduced by avoiding or eliminating the inclusion of such an ignition device.

It is to be understood that the above discussions of theory, such as the discussion relating to the inclusion of a sensitizing gas in association with the gas generant material contained in the subject inflator devices, for example, are included to assist in the understanding of the subject invention and are in no way limiting to the invention in its broader applications.

Thus, the invention generally provides an elongated inflator device of suitable design and construction such as to desirably permit the inflator device to be shaped to a non-linear elongated axis form and such as may be desired to facilitate installation or placement thereof in particular locations within the interior of a vehicle, such as along the roof line of a vehicle such as above a vehicle door. In particular, the invention provides such an inflator device particularly suited for use in conjunction with specific types of inflatable restraint elements, such as inflatable curtain forms or types of inflatable elements. That is, the invention generally provides such an inflator device having or being of sufficiently flexibility and small enough diameter to facilitate such placement in a vehicle while simultaneously providing sufficient inflation gas in sufficient quantities and at desired point(s) in time to provide desired side impact protection, including desired stand-up times.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator device for inflating an inflatable restraint element, the inflator device comprising:
    an enclosed housing having an elongated length and opposed first and second ends;
    a quantity of a gas generant material disposed within the housing, the gas generant material having a non-gaseous, fluid form and substantially extending between the first and second ends of the housing; and
    an initiator device disposed adjacent the housing, upon actuation, the initiator device having a discharge portion in reaction initiating contact with at least a portion of the quantity of the gas generant material disposed within the housing;
    wherein upon actuation, the initiator device initiates reaction of the gas generant material to produce inflation gas and
    wherein the housing has sufficient flexibility to permit the inflator device to be shaped to a non-linear elongated axis form.

2. The inflator device of claim 1 wherein the initiator device is disposed adjacent the housing at the first end thereof.

3. The inflator device of claim 1 wherein the initiator device is disposed adjacent the housing at a point intermediate the first and second ends thereof.

4. The inflator device of claim 1 additionally comprising a sheath disposed about the exterior of the housing.

5. The inflator device of claim 1 additionally comprising an ignition device disposed within the housing and substantially extending between the first and seconds ends thereof.

6. The inflator device of claim 1 wherein the gas generant material contains a quantity of sensitizing gas.

7. The inflator device of claim 1 wherein the gas generant material is in the form of a liquid.

8. The inflator device of claim 1 wherein the gas generant material is in the form of a paste.

9. The inflator device of claim 1 wherein the housing is tubular.

10. The inflator device of claim 9 wherein the tubular housing is of circular cross section.

11. A method for inflating an inflatable restraint element, the method comprising:
    initiating reaction of the gas generant material disposed within the housing of the inflator device of claim 1.

12. An inflator device for inflating an inflatable restraint element the inflator device comprising:
    an enclosed housing having an elongated length and opposed first and second ends;
    a quantity of a gas generant material disposed within the housing, the gas generant material having a non-gaseous, fluid form and substantially extending between the first and second ends of the housing; and an initiator device disposed adjacent the housing, upon actuation, the initiator device having a discharge portion in reaction initiating contact with at least a portion of the quantity of the gas generant material disposed within the housing;

wherein upon actuation, the initiator device initiates reaction of the gas generant material to produce inflation gas and wherein the gas generant material contains a quantity of sensitizing gas.

13. The inflator device of claim 12 wherein the initiator device is disposed adjacent the housing at the first end thereof.

14. The inflator device of claim 12 wherein the initiator device is disposed adjacent the housing at a point intermediate the first and second ends thereof.

15. The inflator device of claim 12 additionally comprising a sheath disposed about the exterior of the housing.

16. The inflator device of claim 12 additionally comprising an ignition device disposed within the housing and substantially extending between the first and seconds ends thereof.

17. The inflator device of claim 12 wherein the sensitizing gas is selected from the group consisting of oxygen, nitrous oxide, carbon dioxide and mixtures thereof.

18. A method for inflating an inflatable restraint element, the method comprising:

initiating reaction of the gas generant material disposed within the housing of the inflator device of claim 17.

19. The inflator device of claim 12 wherein the sensitizing gas comprises nitrous oxide.

20. The inflator device of claim 12 wherein the sensitizing gas comprises carbon dioxide.

21. The inflator device of claim 12 wherein the sensitizing gas comprises a combustible mixture.

22. The inflator device of claim 12 wherein the gas generant material is in the form of a liquid.

23. The inflator device of claim 12 wherein the gas generant material is in the form of a paste.

24. The inflator device of claim 12 wherein the housing is tubular.

25. The inflator device of claim 24 wherein the tubular housing is of circular cross section.

26. A method for inflating an inflatable restraint element, the method comprising:

initiating reaction of the gas generant material disposed within the housing of the inflator device of claim 12.

27. An inflator device for inflating an inflatable restraint element, the inflator device comprising:

a tubular housing having an elongated length and opposed first and second ends;

a quantity of a gas generant material disposed within the tubular housing, the gas generant material having a non-gaseous, fluid form and substantially extending between the first and second ends of the tubular housing, the gas generant material containing a quantity of sensitizing gas selected from the group consisting of oxygen, nitrous oxide, carbon dioxide and mixtures thereof;

an initiator device disposed adjacent the tubular housing, upon actuation, the initiator device having a discharge portion in reaction initiating contact with at least a portion of the quantity of the gas generant material disposed within the tubular housing; and a sheath covering disposed about the exterior of the tubular housing;

wherein upon actuation, the initiator device initiates reaction of the gas generant material to produce inflation gas resulting in opening of the tubular housing and release of at least a portion of the inflation gas therefrom and wherein the sheath covering is effective to retain therewithin fragmentary portions of the tubular housing formed upon the opening thereof.

28. A method for inflating an inflatable restraint element, the method comprising:

initiating reaction of the gas generant material disposed within the housing of the inflator device of claim 27.

29. The inflator device of claim 27 wherein the initiator device is disposed adjacent the housing at the first end thereof.

30. A method for inflating an inflatable restraint element, the method comprising:

initiating reaction of the gas generant material disposed within the housing of the inflator device of claim 29.

31. The inflator device of claim 27 wherein the initiator device is disposed adjacent the housing at a point intermediate the first and second ends thereof.

32. A method for inflating an inflatable restraint element, the method comprising:

initiating reaction of the gas generant material disposed within the housing of the inflator device of claim 31.

33. The inflator device of claim 27 wherein the tubular housing has sufficient flexibility to permit the inflator device to be shaped to a non-linear elongated axis form.

* * * * *